July 1, 1924.
A. P. GUSTAFSON
DRUM
Filed Feb. 5, 1919
1,500,095
6 Sheets-Sheet 1
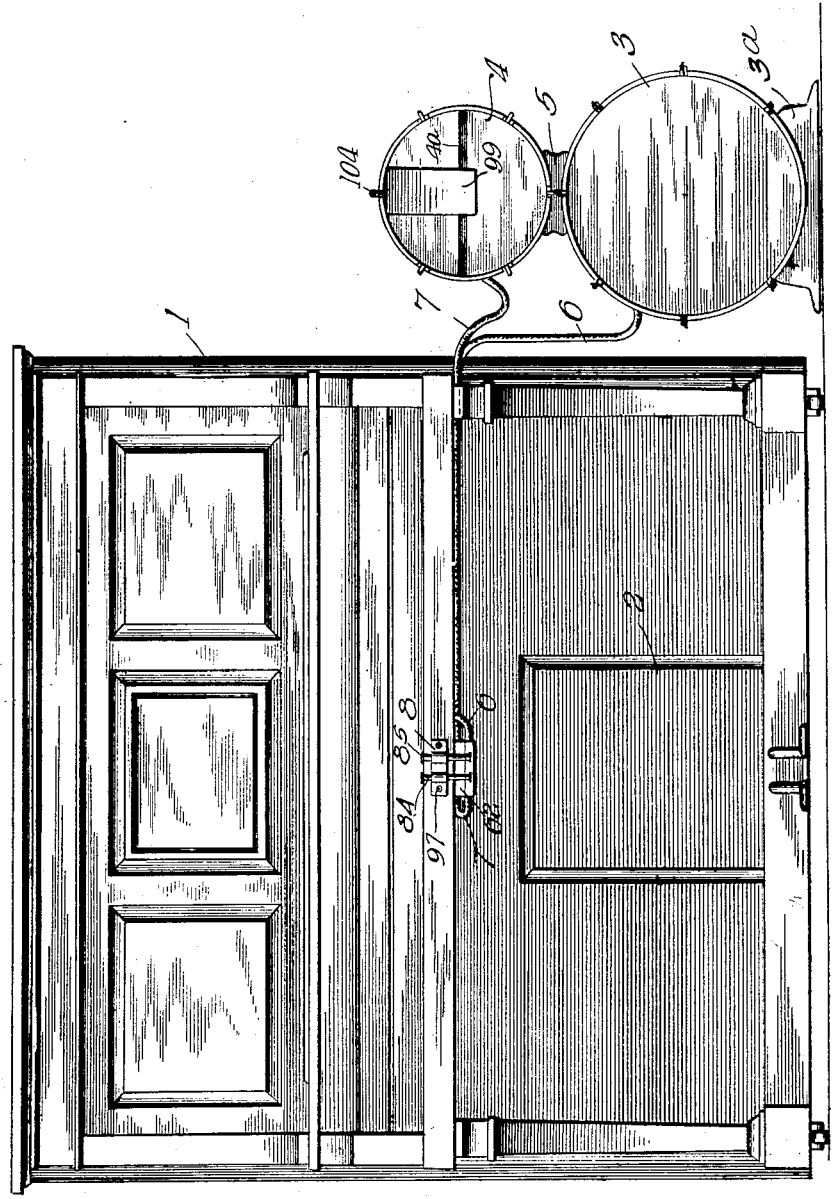
Witnesses:
Harry R. L. White
W. P. Kilroy
Inventor
Adolph P. Gustafson

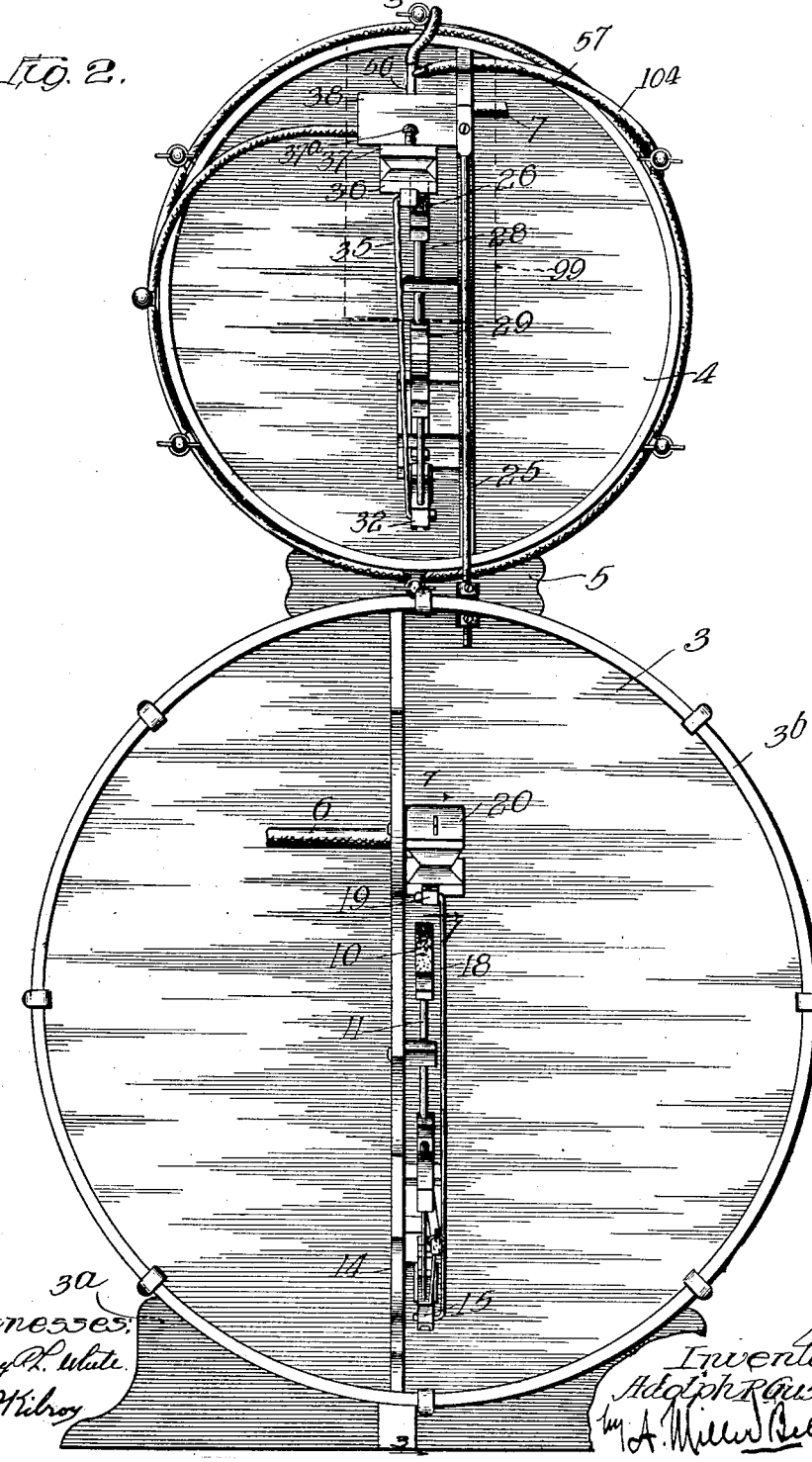

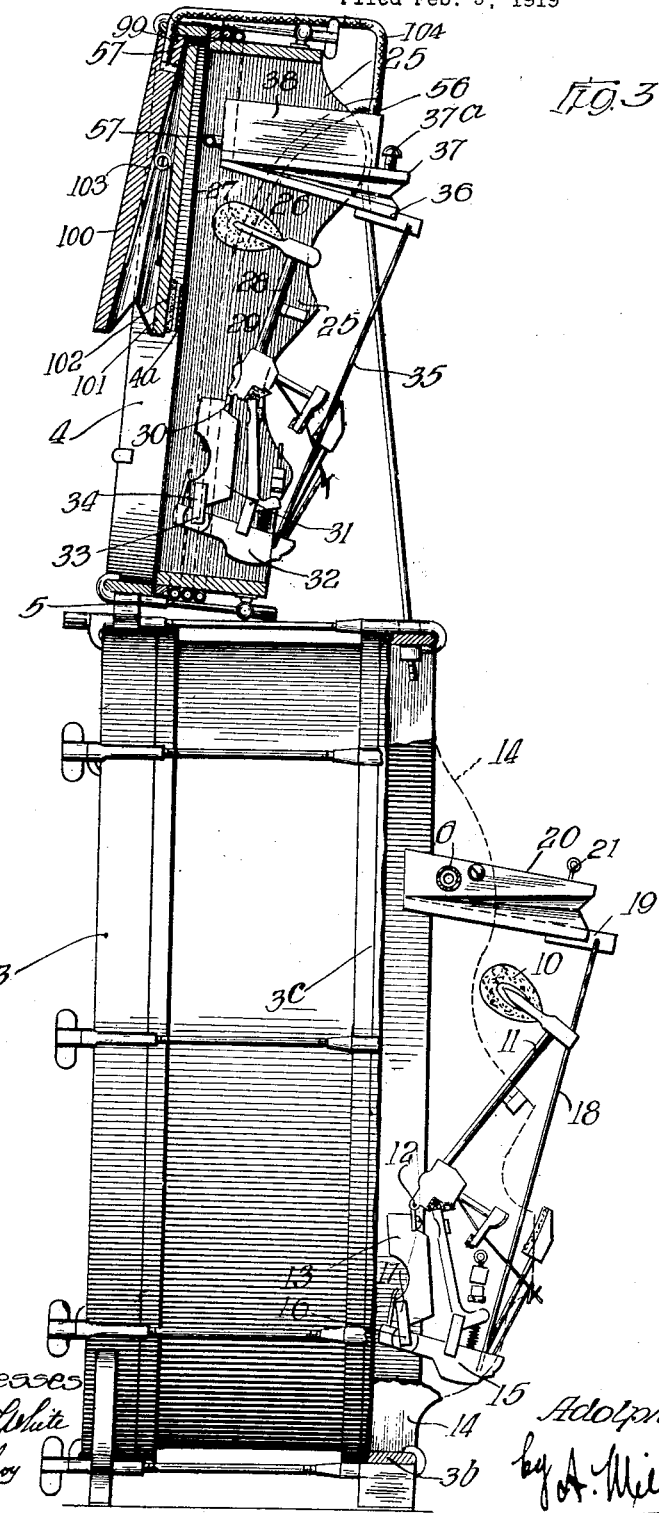

July 1, 1924.
A. P. GUSTAFSON
DRUM
Filed Feb. 5, 1919
1,500,095
6 Sheets-Sheet 4
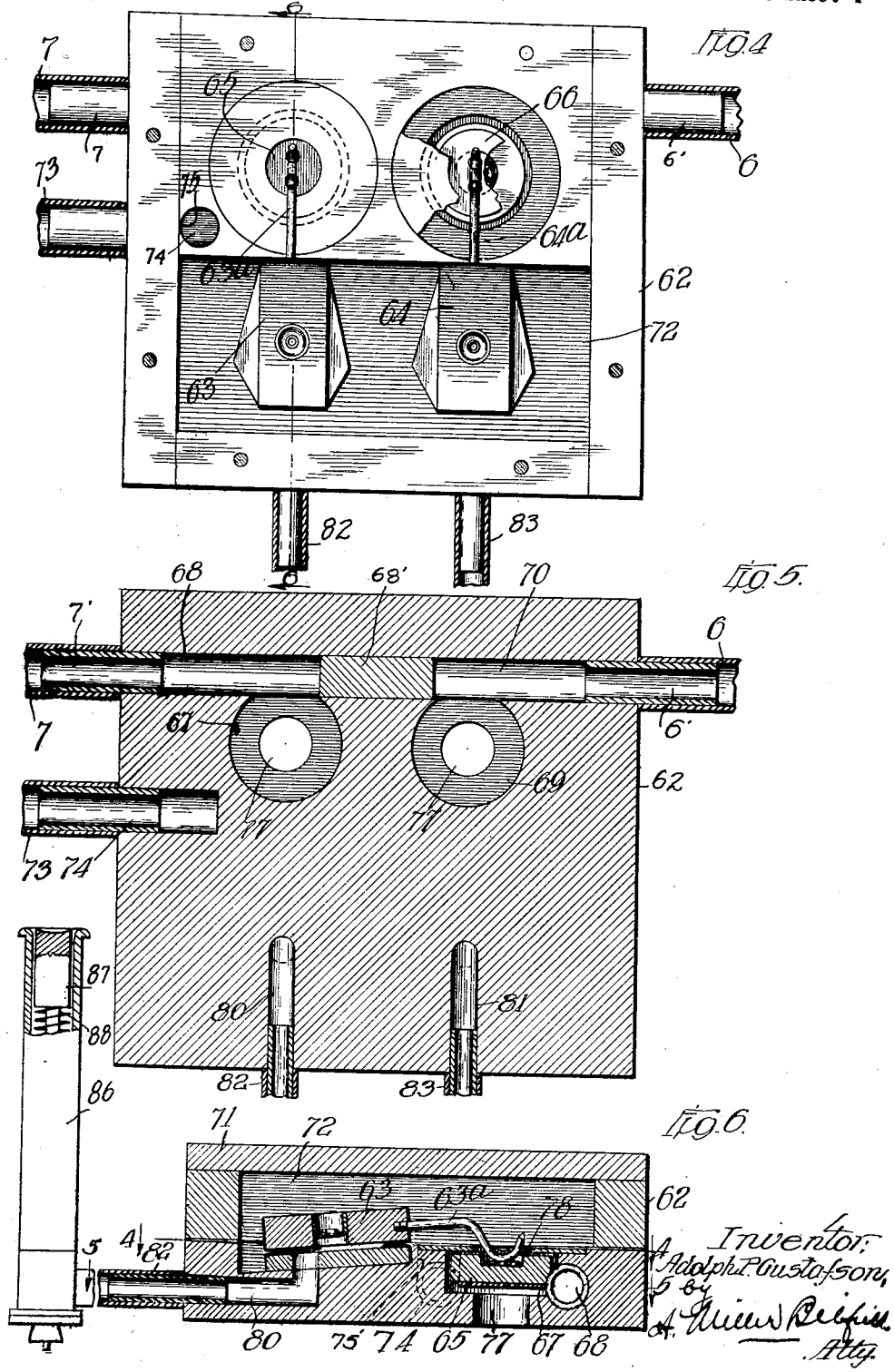

July 1, 1924.
A. P. GUSTAFSON
DRUM
Filed Feb. 5, 1919
1,500,095
6 Sheets-Sheet 5
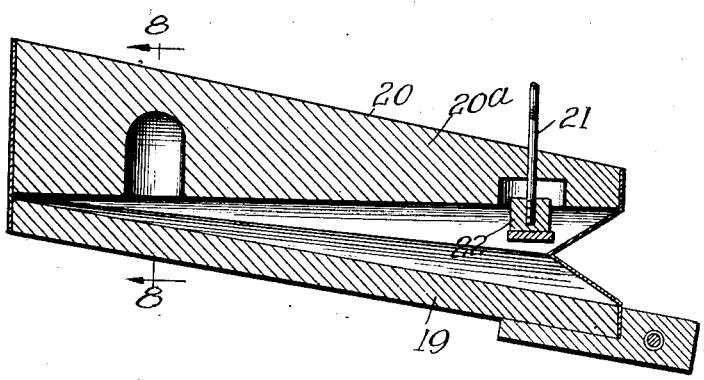
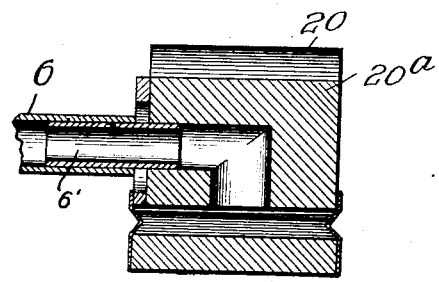
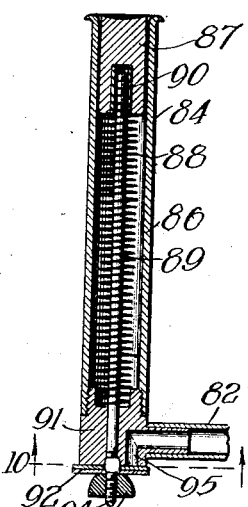
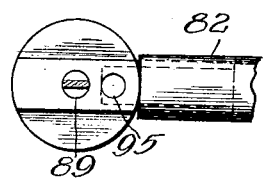

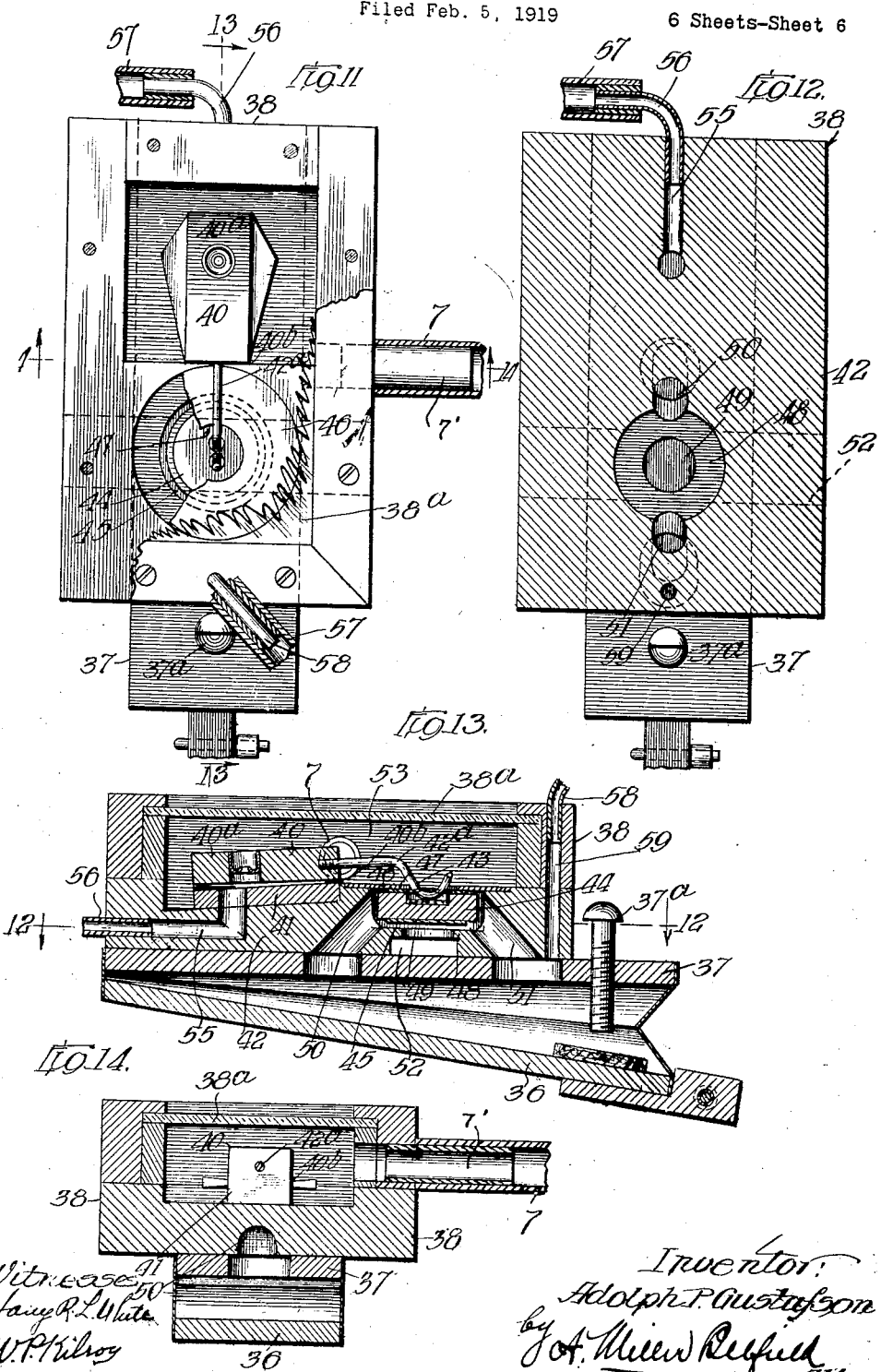

Patented July 1, 1924.

1,500,095

UNITED STATES PATENT OFFICE.

ADOLPH PETER GUSTAFSON, OF CHICAGO, ILLINOIS, ASSIGNOR TO M. SCHULZ COMPANY, OF CHICAGO, ILLINOIS.

DRUM.

Application filed February 5, 1919. Serial No. 275,082.

*To all whom it may concern:*

Be it known that I, ADOLPH P. GUSTAFSON, a citizen of the United States, residing at Chicago, in the county of Cook and State of Illinois, have invented a certain new and useful Improvement in Drums, of which the following is a full, clear, concise, and exact description, reference being had to the accompanying drawings, forming a part of this specification.

My invention relates to drums.

One of the objects of the invention is to arrange for the automatic operation of a drum.

Another object of the invention is to provide for the automatic operation of a snare drum to produce what is called a "roll."

Another object of the invention is to provide for the automatic operation of a large bass drum so as to produce simply a single stroke or beat of the same.

Another object of the invention is to arrange for the automatic operation of either a snare or bass drum, or both, in connection with a piano.

Another object of the invention is to arrange for the efficient and convenient control of such drum operation either in connection with a piano or otherwise.

In the accompanying drawings Fig. 1 is a front elevation of a piano and a snare and a bass drum connected with said piano for automatic operation;

Fig. 2 is a rear elevation of the two drums and the automatic mechanism for operating the same;

Fig. 3 is a side elevation of said drums, partly in section;

Fig. 4 is a view of a box composing part of the controlling mechanism for said drums, said Fig. 4 being a cross section taken on line 4—4 in Fig. 6;

Fig. 5 is a cross section taken on line 5—5 in Fig. 6;

Fig. 6 is a cross section taken on line 6—6 in Fig. 4;

Fig. 7 is a longitudinal section of a pneumatic for operating one of said drums;

Fig. 8 is a cross section taken on line 8—8 in Fig. 7;

Fig. 9 is a longitudinal section of a manually operable device forming part of the mechanism for controlling the drum operation;

Fig. 10 is a cross section taken on line 10—10 in Fig. 9;

Fig. 11 is a view of a pneumatic device forming part of the drum operating mechanism;

Fig. 12 is also a view of the same, taken on line 12—12 in Fig. 13;

Fig. 13 is a longitudinal section taken on line 13—13 in Fig. 11; and

Fig. 14 is a cross section taken on line 14—14 in Fig. 11.

Referring to the drawings I show in Fig. 1 a piano 1, which is preferably a player piano, containing pneumatic mechanism by which it may be played automatically by pneumatic pressure. In the front of the piano I show a door 2 which is understood to be the usual door closing a front opening through which pedals for operating the pneumatic mechanism of the player piano are moved in and out. In view of the fact that the player mechanism forms no part of my present invention I have not shown and do not describe the same herein.

At one side of this piano 1 I show two drums 3 and 4, suitably mounted, preferably one above the other. The drum 3 is the larger, being a bass drum, and the drum 4 is the smaller, being a snare drum. The drum 3 is mounted on a bracket 3ª and a bracket 5 is interposed between the drums, being secured or otherwise mounted upon the top of the rim of the bass drum 3, and in turn supporting the snare drum 4.

In accordance with my invention suitable automatic mechanism, preferably of the pneumatic type, is provided for these two drums, by which they may be automatically operated. Suitable connections 6 and 7 are preferably extended between the drums and the piano so as to permit the automatic operation of the drums by the person playing or operating the piano. To such end the connections 6 and 7 are shown extended to a point at the front of the piano, preferably about midway between its sides and there connected with suitable controlling devices 8 which will be more fully hereinafter described.

Referring to the drum operating mechanism, this is best shown in Figs. 2 and 3. For operating the bass drum I show a piano action having a hammer 10 whose arm 11 is pivotally mounted at 12 to a bracket or support 13. Said bracket 13 is mounted upon a bracket 14 which extends across the entire diameter of the drum and is secured at its upper and lower ends to the rim 3ᵇ of the drum. The wippen 15 on the piano action is pivoted at 16 to the lower end of a small bracket 17 which is also secured to the support 13. The wippen 15 is connected by an operating rod 18 with the loose or swinging leaf 19 of a pneumatic 20 which latter is mounted upon the supporting bracket 14. Thus the operation of the pneumatic 20 will operate the piano action and cause its hammer to strike the head 3ᶜ of the drum 3 and so play the drum. The pneumatic 20 is shown in detail in Figs. 7 and 8, and has an adjusting screw 21 passing through the top or fixed leaf 20ᵃ and provided inside of the pneumatic with an adjustable member 22 forming a stop to limit the upward or actuating stroke of the swinging leaf 19. The connecting tube 6 previously referred to extends from the pneumatic 20 to the piano and is understood to be the means of communicating varying pneumatic pressure to said pneumatic so as to operate the same. The arrangement for so doing will be described later.

The upper or snare drum 4 is also arranged for playing or operation by a piano action which is mounted on a brace or bracket support 25 extending across the drum and having its upper and lower ends secured to the rim thereof. The hammer 26 of this piano action is arranged to strike the drum head 27 and its arm 28 is pivotally mounted at 29 to a small bracket 30 carried by the support 31.

From the swinging end of the wippen 32 an operating rod 35 extends up to and is connected with the loose or swinging leaf 36 of a pneumatic 37. Thus the actuation of the pneumatic 37 will cause the operation of the piano action and cause the hammer 26 thereof to strike the drum head and play the drum.

The pneumatic 37 is operated by suitable pneumatic valve mechanism which is arranged within a box or casing 38, which is also secured to the upright supporting bracket 25, the pneumatic 37 being preferably secured to the underside of this box or casing 38.

The construction of the box or casing 38 and the valve mechanism therein is best shown in Figs. 11 to 14, inclusive. In this construction there is provided a small pneumatic 40 having its stationary member 41 mounted upon a base piece or block 42 forming the bottom of the box or casing 38. The pneumatic 40 is constructed with a hinged swinging leaf 40ᵃ hinged at 40ᵇ and provided with an arm or rod 42ᵃ having a hooked end 43 engaging a valve 44. This valve 44 is arranged within a valve chamber 45 having an upper valve seat 46 provided with a port 47 and a lower valve seat 48 provided with a port 49, which ports 47 and 49 are controlled by being opened and closed by the valve 44. Ducts or passages 50 and 51 extend from the valve chamber 45 to the interior of the pneumatic 37. The port 49 communicates with a chamber or recess 52 so that when said port is open the valve chamber 45 is connected with the chamber or recess 52 which is understood to be open to the outside air. The other port 47 is in communication with a large chamber or recess 53 which is in communication with the tubular member 7 extending to the piano as previously described. This member 7 is a means of communicating varying pneumatic pressure to the chamber 53 as will be hereafter set forth.

A duct 55 is formed in the base piece 42 and communicates with the interior of the pneumatic 40. This duct 55 is connected with a tube 56 which in turn is connected with a flexible tube 57, which latter extends to the other end of the box or casing 38 and is connected with a tube 58 communicating with a duct 59 which communicates with the interior of the pneumatic 37. Thus when the pressure in the chamber 53 is reduced the pneumatic 40 is expanded, the interior of such pneumatic being in communication with the outside air at the time by means of the duct 55, tubes 56, 57 and 58, and duct 59 to the interior of the pneumatic which is in communication with the outside air through ducts 50, 51, valve chamber 45, port 49 and recess 52. This expansion of the pneumatic 40 immediately causes the depression of the valve 44, whereupon the port 49 is closed and the port 47 opened and the air is immediately exhausted from the interior of the pneumatic by the passages 50 and 51 and valve chambers 45 and 53; whereupon the pneumatic 37 instantaneously collapses, thereby actuating the piano action and causing the piano hammer thereof to strike the drum head and play the drum. Immediately the pneumatic 37 collapses, however, the air is also exhausted from the duct 59 and tubes 58, 57 and 56 and duct 55, also from the interior of the pneumatic 40, thereby permitting the outside air to collapse said pneumatic by allowing it to act through the port 49 upon the valve 44. Immediately this is done the outside air is again permitted to rush into the pneumatic 37 through the port 49, valve chamber 45 and ducts 50 and 51, whereby said penumatic is again expanded and the piano action hammer retracted from the drum head. But when the pneumatic 37 is so expanded outside air again finds access through it to the duct 59, tubes 58, 57 and 56, to the duct 55, thereby again expanding the pneumatic 40 and causing the valve 44 to descend and close the port 49 and open the port 47 which permits exhaustion of the air from the interior of the pneumatic 37 and again collapses said pneumatic, whereby the piano action is again operated to cause its hammer to strike the drum head and play the drum. When this occurs the exhaustion of the air in pneumatic 37 again causes exhaustion of air from the duct 59 and tubes 58, 57 and 56, and pneumatic 40, thereby causing the collapse of said pneumatic 40 and again opening the port 49 to permit outside air to enter the pneumatic 37 and so expand said pneumatic and causes the piano hammer to be retracted from the drum head. In this way a constant and continual automatic operation of the piano action will be caused to produce a repeated striking of the drum head by the piano action hammer, and this will be continued as long as the pneumatic pressure is reduced in the chamber 53. This repeated striking or operation of the drum will thereby produce what is commonly known as the "roll."

The tube 57 must necessarily have some length in order to retard the pneumatic operation of the mechanism just described. As a preferred arrangement this tube 57 is wound around the drum 4 two or three times, as shown in Figs. 2 and 3. The length may be varied and adjusted to give the desired interval between successive strokes of the piano action.

The box or casing 38 is preferably provided with a glass cover 38ª by which the interior valve mechanism and its operation may be seen. The pneumatic 37 is also preferably provided with an adjustable screw 37ª by which the length of stroke of the swinging leaf 37 may be controlled.

Referring now to the mechanism by which the pneumatic pressure in the tubes or connections 6 and 7 is controlled in order to control the drum playing devices, this mechanism is best shown in Figs. 4, 5, 6, 7, 9 and 10. In Figs. 4, 5, and 6 there is shown a box or casing 62 to which the tubes or connections 6 and 7 are attached. This box or casing 62 is preferably secured to the piano 1 in some convenient or desirable place, as for example by securing it underneath the key bed, as shown in Fig. 1. Within this box or casing there are located two operating pneumatics 63 and 64, having arms 63ª and 64ª, engaging and controlling valves 65 and 66, respectively. The valve 65 is located in a valve chamber 67, as shown in Fig. 5, and this valve chamber 67 communicates with a duct or passage 68 connected with the tube or connection 7. In a similar way the valve 66 is located in a valve chamber 69 and communicates with a duct or passage 70 which is connected with the tubular member or connection 6. The passages 68 and 70 are desirably formed by drilling a hole through the block containing these passages and inserting a plug 68' in this hole to separate the two passages. The sleeves 6' and 7' are inserted respectively into passages 70 and 68, and also respectively into the tubular connections 6 and 7 whereby these sleeves act as unions. The top 71 of the box or casing 62 is separated from the bottom of the same so as to form a chamber 72 and this chamber is connected with the wind inducing apparatus of the device so that a reduced air pressure is always normally present in the chamber 72 when the instrument is in operation. To produce this result connection may be made between the chamber 72 and the bellows of the device, or with some duct or passage communicating with the bellows. For such purpose I have shown a tubular member 73 which is understood to run either to the bellows or wind chest, or some suitable connection, which is connected to a duct or passage 74 communicating with an aperture 75 formed in the bottom of said box or casing 62 whereby by means of the aperture 75 the tubular member 73 establishes communication of the chamber 72 with the wind inducing apparatus.

Thus it will be seen that when the instrument is in operation and the chamber 72 has its air pressure reduced, the pneumatics 63 and 64 will be collapsed as shown in Fig. 6, by reason of the air pressure acting upwardly against the valves 65 and 66 through air ports 77 formed in the bottom of said box or casing. With the valves 65 and 66 in these positions closing the ports 78 the reduced air pressure from the chamber 72 is not communicated to the valve chambers 67 and 69. When, however, either one or both of the pneumatics 63 and 64 are expanded and their valves 65 and 66 depressed, the reduced air pressure in the chamber 72 reduces the air pressure in the ducts 68 and 70, (Fig. 5), and therefore in the connections 7 and 6, respectively. As previously explained, reduced air pressure in the connection 7 causes the operation of the snare drum 4, as long as said air pressure is reduced, such operation being a series of blows or beats upon the drum 4. It has also been explained that reduced air pressure in the connection 6 causes the operation of the pneumatic 20 (Fig. 3), and thus produces a beat or blow upon the base drum 3, this pneumatic 20 operating only once when the air pressure is reduced in the tube 6, instead of operating by continuous beats or blows as when the air pressure is reduced in the connection 7.

As an arrangement for actuating the pneumatics 63 and 64 for causing the reduced air pressure in the connections 7 and 6, respectively, ducts 80 and 81 respectively, are formed in the bottom of the box or casing 62 and connected with tubes 82 and 83, respectively. These tubes 82 and 83 are extended to manually operable devices, as for example, the cylindrical members 84 and 85 shown in Fig. 1 as mounted upon the front of the piano key bed, said devices also being shown in Figs. 9 and 10. Each one of these devices 84 and 85 comprises, as shown in Fig. 9, a cylindrical tubular member 86 having its upper end provided with a button or finger piece 87 which is supported in an elevated position by the spring 88. A valve rod 89 is also arranged within the member 86 and has its upper end attached by means of a threaded end 90 with the finger piece 87 and has its lower end extended through the bottom 91 of the device and attached to a valve 92 by means of a button 93 on the lower threaded end 94. The valve 92 controls a port or passage 95 which communicates with the interior of the tube 82 in the case of one device, and with the tube 83 in the case of the other device. Thus it will be seen that when the manually operable member 84 is in its normal condition the spring 88 will hold the finger piece or button 87 in an elevated position, and thereby cause the valve 92 to close the port or passage 95. When, however, the button 87 is depressed the valve 92 will open the port or passage 95 and permit air to enter said port or passage, and also enter the tube, whereupon the pneumatic 63 will be expanded and the valve 65 depressed, thereby closing the air port 77 to the valve chamber 67 and opening said valve chamber 67 to the chamber 72. As a result the reduced pneumatic pressure condition existing in the chamber 72 will be communicated to the valve chamber 67 and thence to the duct 68 and tube or connection 7. This, as previously explained, will cause the repeated operation of the snare drum 4. In a similar manner the depression of the button 87 in the manually controlled member 85 will cause the admission of air into the tube 83 and thereby cause the vacuous or reduced pneumatic pressure condition of the chamber 72 to be communicated through the valve chamber 69 and the duct 70 to the member or connection 6, thereby causing the operation or playing of the bass drum 3. These members 84 and 85 may be secured in convenient position on the piano, as for example, by a bracket 97 (Fig. 1). Thus it will be seen that the drums may be independently operated, either alone or together, and this may be done in a very convenient manner by mechanism readily accessible to the person playing the player piano.

In the operation of the instrument the transverse strings 4ª of the snare drum are likely to rattle or make an undesirable noise, particularly when the bass drum is operated. This I preferably prevent by the use of a special pneumatic 99. This pneumatic is arranged in front of the drum 4 and is preferably secured to the upper edge portion of the rim thereof, as shown in Fig. 3. It has a fixed member 100 and a swinging member 101, which latter carries a layer 102 of felt or other suitable material which is arranged in position opposite the strings 4ª. A spring 103 tends to hold the swinging member 101 in an open or expanded position whereby the felt 102 will come in contact with the strings 4ª and thereby prevent the same from rattling. A tubular connection 104 extends from the pneumatic 99 to the tube 7, whereby said pneumatic 99 is put in communication with said tube 7.

Thus when the snare drum is not in use the pneumatic 99 will be expanded so that its swinging member will place the cushion or felt layer 102 in contact with the strings 4ª and thereby suppress or silence said strings and prevent their rattling and interfering objectionably with the playing of the other parts of the instrument, as for example the bass drum or the piano player 1. When, however, the snare drum is put in operation the reduced pressure or "suction," as it is commonly called, in the tube 7, will reduce the air pressure in the pneumatic 99 and thereby cause a collapse of said pneumatic and the withdrawal of the swinging member 101 from the strings 4ª, and from the head of said snare drum, whereby said snare drum may be played in the usual manner without being interfered with by said pneumatic 99.

It will be understood that changes and modifications may be made without departing from the spirit of the invention.

What I claim is:

1. The combination with a player piano of a pair of drums mounted at one side of the player piano, mechanism controlled and pneumatically actuated for the operation of one of the drums for a single beat and the other of the drums for a plurality of beats, connections extending between said pneumatic mechanism and the player piano and means on the player piano for controlling said pneumatic mechanism, said last mentioned means comprising manually operable devices combined with mechanism for controlling the pneumatic pressure in said connections, said manually operable devices being mounted in position at the front and near the middle of the player piano keyboard, and consisting of vertically arranged tubular members containing spring controlled push buttons mounted on actuating rods provided with valves controlling the pneumatic pressure in said connections.

2. The combination of a pair of drums, mechanism pneumatically actuated and manually controlled for the operation of one of the drums for a single beat and the other of the drums for a plurality of beats, means for producing variations in pneumatic pressure, connections between said pneumatic mechanism for beating said drums and said pressure varying means, and controlling devices for controlling the communication of variable pneumatic pressure to said connections.

3. The combination of bass and snare drums, the snare drum being mounted above and upon the bass drum, pneumatic mechanism for beating said drums and means for controlling said pneumatic mechanism so that the bass drum is operated for a single beat and the snare drum for a plurality of beats, said mechanism and means including piano actions mounted on each of said drums and means for controlling said piano actions, said means comprising valves and pneumatics controlling said valves, and means for controlling said pneumatics.

4. The combination of bass and snare drums, the snare drum being mounted above and upon the bass drum, pneumatic mechanism for beating said drums and means for controlling said pneumatic mechanism, said mechanism and means including piano actions mounted on each of said drums and means for controlling said piano actions, said means comprising valves and pneumatics controlling said valves for operating the bass drum for a single beat and for operating the snare drum for a plurality of beats, and means for controlling said pneumatics, said means consisting of tubular connections, manually operable devices, and means for controlling the pressure in said tubular connections.

5. The combination of bass and snare drums, the snare drum being mounted above and upon the bass drum, pneumatically actuated mechanism for beating said drums and means for controlling said pneumatic mechanism, said mechanism and means consisting of piano actions mounted on each of said drums and pneumatic means for controlling said piano actions, said means comprising valves and pneumatics controlling said valves for operating the bass drum for a single beat and for operating the snare drum for a plurality of beats, and means for controlling said pneumatics, said means consisting of tubular connections, manually operable devices, and means for controlling the pressure in said tubular connections, said means consisting of a valve box containing valves and pneumatics and provided with a chamber in which the air pressure is reduced and ducts controlled by said valves so that when said pneumatics are actuated, the reduced pressure of said chamber will be communicated respectively to said tubular connections.

6. In combination, a bass and a snare drum, the snare drum mounted upon said bass drum, piano actions having hammers for beating said drums, a pneumatic operating said bass drum piano action at intervals, and a pneumatic mechanism actuating said snare drum piano action continuously.

7. The combination with a pneumatically operated musical instrument, of a bass drum and a snare drum thereon and completing a unit separate from the musical instrument, piano actions on said drums for beating the same, pneumatically actuated mechanism manually controlled from the piano for operating the action of said bass drum for a single beat, and pneumatically actuated mechanism manually controlled from the piano for operating the action of said snare drum for a plurality of beats.

8. In combination, bass and snare drums, pneumatically operated means for beating the bass drum a single beat, and the snare drum a plurality of beats in uninterrupted rapid sequence, and manual means for controlling said pneumatic means.

9. The combination with a pneumatically operated musical instrument of bass and snare drums, means operated by the pneumatic pressure of the musical instrument for sounding a single beat on the bass drum, and means for sounding a plurality of beats on the snare drum in uninterrupted sequence, and manually operated means on the piano for controlling said pneumatic means.

10. The combination with a piano operated by pneumatic means, of bass and snare drums mounted as a unit near the piano, a piano action and hammer on the base drum, a piano action and hammer on the snare drum, pneumatics mounted on said drums for actuating said piano actions, manually controlled means for actuating the piano actions by pneumatic pressures from the piano mechanism, and means associated with one of the drum pneumatics for causing the same to impart a series of movements to the hammer thereof.

11. The combination with a pneumatically operated player piano, of a pair of drums arranged in a separate entity adjacent the piano, pneumatic means for sounding said drums, manual means on the piano for delivering pneumatic pressure from the piano to the pneumatic means on one of the drums for actuating the same for a single beat, manual means also for delivering pneumatic pressure from the piano to the other drum, and means associated with the pneumatic means of said other drum for operating the said means thereof continuously independently of said manual means.

In witness whereof, I hereunto subscribe my name this 3rd day of January, A. D. 1919.

ADOLPH PETER GUSTAFSON.